(12) United States Patent
Krishan

(10) Patent No.: US 11,115,403 B2
(45) Date of Patent: Sep. 7, 2021

(54) MULTI-LEVEL USER DEVICE AUTHENTICATION SYSTEM FOR INTERNET OF THINGS (IOT)

(71) Applicant: Baldev Krishan, Pleasanton, CA (US)

(72) Inventor: Baldev Krishan, Pleasanton, CA (US)

(*) Notice: Subject to any disclaimer, the term of this patent is extended or adjusted under 35 U.S.C. 154(b) by 244 days.

(21) Appl. No.: 15/897,195

(22) Filed: Feb. 15, 2018

(65) Prior Publication Data
US 2018/0183779 A1 Jun. 28, 2018

Related U.S. Application Data

(60) Provisional application No. 62/461,221, filed on Feb. 21, 2017.

(51) Int. Cl.
| | |
|---|---|
| *H04L 29/06* | (2006.01) |
| *G06F 21/32* | (2013.01) |
| *G06F 21/31* | (2013.01) |
| *H04W 12/06* | (2021.01) |
| *H04W 4/70* | (2018.01) |
| *H04W 12/61* | (2021.01) |
| *H04W 12/65* | (2021.01) |

(52) U.S. Cl.
CPC ............ *H04L 63/083* (2013.01); *G06F 21/31* (2013.01); *G06F 21/32* (2013.01); *H04L 63/105* (2013.01); *H04W 4/70* (2018.02); *H04W 12/06* (2013.01); *G06F 2221/2113* (2013.01); *H04L 63/0861* (2013.01); *H04L 2463/121* (2013.01); *H04W 12/61* (2021.01); *H04W 12/65* (2021.01)

(58) Field of Classification Search
CPC ................. H04L 63/083; H04L 63/105; H04L 2463/121; H04W 4/70; H04W 12/06; G06F 21/31; G06F 21/32
See application file for complete search history.

(56) References Cited

U.S. PATENT DOCUMENTS

| | | |
|---|---|---|
| 7,483,984 B1 | 1/2009 | Jonker et al. |
| 7,894,634 B2 | 2/2011 | Chung |
| 7,941,664 B2 | 5/2011 | Wheeler |
| 7,945,034 B2 | 5/2011 | Gonen et al. |
| 8,462,920 B2 | 6/2013 | Gonen et al. |

(Continued)

FOREIGN PATENT DOCUMENTS

WO WO 2016/145454 A1 9/2016

OTHER PUBLICATIONS

U.S. Appl. No. 15/636,827, filed Jun. 29, 2017.

(Continued)

*Primary Examiner* — Shanto Abedin
(74) *Attorney, Agent, or Firm* — Eversheds Sutherland (US) LLP; Christopher C. Bolten; Robert D. Ward

(57) ABSTRACT

The present invention describes the user authentication system comprising of multiple levels of security which is used to authorize the user. The system uses more than one levels of authentication process which receives the credentials from the user and authorizes them to allow access to the IoT devices which are used by the user.

The connected devices represent individual targets, for the cyber-criminals who 20 would hack the devices to retrieve the secure information of the users. Such insecurities about the IoT devices and the system are eliminated by using the multiple level user authentication system which is described in the present invention.

14 Claims, 6 Drawing Sheets

(56) References Cited

U.S. PATENT DOCUMENTS

| | | | |
|---|---|---|---|
| 8,687,038 B2 | 4/2014 | Gonen et al. | |
| 8,914,855 B2 | 12/2014 | Whitmyer, Jr. | |
| 9,088,556 B2 | 7/2015 | Truskovsky et al. | |
| 9,172,699 B1* | 10/2015 | Vazquez | G06F 21/32 |
| 9,300,792 B2 | 3/2016 | Gonen et al. | |
| 9,467,443 B2 | 10/2016 | Mohan | |
| 9,762,392 B2* | 9/2017 | Carrer | H04L 9/321 |
| 9,767,262 B1 | 9/2017 | Canavor et al. | |
| 9,860,241 B2 | 1/2018 | Dixon et al. | |
| 10,021,088 B2 | 7/2018 | Innes et al. | |
| 10,055,575 B2 | 8/2018 | Adams et al. | |
| 10,146,931 B1 | 12/2018 | Kronrod et al. | |
| 10,339,293 B2 | 7/2019 | Yang et al. | |
| 2004/0193925 A1 | 9/2004 | Safriel | |
| 2006/0104224 A1 | 5/2006 | Singh et al. | |
| 2006/0183462 A1 | 8/2006 | Kolehmainen | |
| 2007/0074038 A1 | 3/2007 | Arenburg et al. | |
| 2008/0010674 A1 | 1/2008 | Lee | |
| 2009/0042541 A1 | 2/2009 | Yi et al. | |
| 2013/0179692 A1 | 7/2013 | Tolba et al. | |
| 2013/0254856 A1 | 9/2013 | Krishan | |
| 2014/0101453 A1 | 4/2014 | Senthurpandi | |
| 2014/0173708 A1 | 6/2014 | Garlick | |
| 2014/0189808 A1* | 7/2014 | Mahaffey | H04L 63/083 726/4 |
| 2014/0337930 A1 | 11/2014 | Hoyos et al. | |
| 2015/0143490 A1 | 5/2015 | Fang | |
| 2015/0278510 A1 | 10/2015 | Alexander | |
| 2015/0295930 A1 | 10/2015 | Dixon et al. | |
| 2016/0014457 A1* | 1/2016 | Dua | H04L 63/083 725/25 |
| 2016/0057136 A1 | 2/2016 | Wang | |
| 2016/0063235 A1 | 3/2016 | Tussy | |
| 2016/0269403 A1 | 9/2016 | Koutenaei et al. | |
| 2016/0359864 A1* | 12/2016 | Dhaliwal | H04L 63/0861 |
| 2016/0379220 A1* | 12/2016 | Tunnell | G06Q 20/40145 705/71 |
| 2017/0019390 A1* | 1/2017 | Gu | H04L 63/08 |
| 2017/0076293 A1 | 3/2017 | Cage et al. | |
| 2017/0085563 A1 | 3/2017 | Royyuru | |
| 2017/0086069 A1 | 3/2017 | Liu | |
| 2017/0142191 A1 | 5/2017 | Caldwell | |
| 2017/0201513 A1 | 7/2017 | Krempel et al. | |
| 2017/0286656 A1* | 10/2017 | Kohli | G06F 21/35 |
| 2017/0310663 A1 | 10/2017 | Krishan | |
| 2018/0005209 A1 | 1/2018 | Ranganathan et al. | |
| 2018/0075231 A1 | 3/2018 | Subramanian et al. | |
| 2018/0176221 A1* | 6/2018 | Zhou | H04L 63/0884 |
| 2018/0176222 A1* | 6/2018 | Bhaskar | H04L 63/061 |
| 2018/0183779 A1 | 6/2018 | Krishan | |
| 2019/0066114 A1 | 2/2019 | Ross | |
| 2019/0213430 A1 | 7/2019 | Schwartz | |
| 2019/0222570 A1 | 7/2019 | Krishan | |
| 2019/0268332 A1* | 8/2019 | Wang | G06F 21/44 |
| 2019/0370583 A1 | 12/2019 | Van Os et al. | |

OTHER PUBLICATIONS

U.S. Appl. No. 16/118,416, filed Aug. 30, 2018.

PCT International Search Report & Written Opinion dated Jun. 25, 2019 in Int'l PCT Patent Appl. Serial No. PCT/US2019/013716.

Chrome Plugin (Screenshots "SS"), Published Jan. 2015, by iKeyPass, Inc., retrieved from https://chrome.google.com/webstore/detail/byoa/nbnkenkheongccomnjibebdfilcpcefh?hl-en (3 pages).

Faisca, et al., Decentralized Semantic Identity, Semantics 2016 Proceedings of the 12th International Conference on Semantic Systems, Leipzig, Germany, pp. 177-180 (2016).

iKeyVault Website (Screenshots "SS"), Published Oct. 2016, developed by Janani Mohan, retrieved from www.ikeyvault.com (3 pages).

Third-Party Submission Under 37 CFR 1.290 dated Feb. 11, 2018, filed with the U.S. Patent & Trademark Office against U.S. Appl. No. 15/636,827 (3 pages).

Wang, et al., IDKeeper: A Web Password Manager with Roaming Capability Based on USB Key, 2012 International Conference on Industrial Control and Electronics Engineering, pp. 1228-1231.

Wordpress Plugin (Screenshots SS), first published Oct. 2014, by iKeyPass, Inc., retrieved from https://wordpress.org/plugins/search/ikeypass/.

Yang, et al., Cloud Password Manager Using Privacy-Preserved Biometrics, 2014 IEEE International Conference on Cloud Engineering, pp. 505-509.

Agholor, et al., A Secured Mobile-Based Password Manager, 2016, IEEE (pp. 103-108).

International Search Report & Written Opinion dated Sep. 14, 2020 in Int'l PCT Patent Appl. No. PCT/US2020029650.

* cited by examiner

MULTI-LEVEL USER DEVICE AUTHENTICATION SYSTEM FOR INTERNET OF THINGS (IOT)

FIELD OF THE INVENTION

The present invention relates to internet of things (IoT). More particularly, the present invention relates to the user authentication system developed for the internet of things.

BACKGROUND OF THE INVENTION

The Internet of Things (IoT) has also been called the next Industrial Revolution. The internet of things will have huge impact on the way all businesses, governments, and consumers interact with the physical world.

The Internet of Things (IoT) particularly refers to uniquely identifiable devices and their representations in Internet. The concept of IoT devices includes the well-connected devices which are capable of communicating with a server or with a mobile application via a network connection.

According to business intelligence survey, there will be 34 billion devices connected to the internet by 2020 which was 10 billion devices in 2015. Total IoT deices will account for 24 billion devices and the traditional computing devices including smartphones, tablets, smart watches etc. will comprise 10 billion devices. The businesses which adopt IoT solutions can improve their bottom line in three ways including lowering operating costs, increasing productivity and expanding to new markets or developing new product offerings.

When various businesses uses the IoT solutions, the IoT must be secure in order for its feature to be utilized. The IoT devices like smartphones have to be secured and the data which is being shared and the transactions being done have to be secured so that the sensitive information is not leaked. It is the fundamental requirement of today's human-centric Internet that we must be able to know whom we are dealing with when transactions are done using the smartphones.

In current internet system, the websites authenticates their users by requiring a password and browsers authenticate websites through the Secure Sockets Layer protocol. Unfortunately the passwords are not secure enough for the IoT authentication as they can be easily hacked. This makes the internet network more susceptible for data breaches which has a real threat for infringing, on personal privacy, security and data. The sensitive data has to be safeguarded in this rapidly expanding network of connected devices which needs the development of a secure authentication system which is safe to use.

In the wider context of IoT, this idea of user or device authentication becomes ever more prevalent. For example, when a user wants to unlock the connected car with the smartphone, they have to reassure that only the user or the owner is authorized to do so. This process means to ensure the users of the IoT device that they have the authorized credentials to access the information.

One of the ways which are used in tackling this problem of false user authentication is through biometric data which includes unique means of identification such as fingerprints and iris scans that are incredibly difficult to replicate. The use of biometrics and behavioral biometrics like gestures, swipe and pattern predictions creates a superior level of user identification. This significantly increases the security credentials of the device and acts as a major barrier between hackers and their access to data. When the devices communicate in the IoT, the credentials embedded in the devices can not only secure network access and communication, but also support secure services such as virtual private networks, e.g. for software updates.

The best practices for IoT device protection requires the developers to understand all the potential vulnerabilities. Evaluation processes needs to cover the privacy, safety, and fraud, cyber-attacks and IP theft. The disk evaluation has to be done as the cybercriminals always find different ways to create the threats. Strong authentication, encryption and securely managed encryption keys also need to be included to secure information stored on the device and in motion. After developing a system which includes all the above mentioned, features, the cyber-criminals still find ways to hack into the system to retrieve the sensitive information of the users which might cause heavy damage to the business of the users.

Therefore there is a need for a secure user authentication system which not only protects the data of the users but also carefully authorizes the user in every possible way which makes it difficult for the cybercriminals to hack into the system.

OBJECTS OF THE INVENTION

The primary object of the present invention is to provide a secure user authentication system for Internet of Things (IoT).

Another object of the present invention is to provide multiple levels of authentication for the Internet of Things (IoT).

SUMMARY OF THE INVENTION

The present invention describes the user authentication system comprising of multiple levels of security which is used to authorize the user. The system uses more than one levels of authentication process which receives the credentials from the user and authorize them to allow access to the IoT devices which are used by the user.

The connected dew ices represent individual targets for the cyber-criminals who would hack the devices to retrieve the secure information of the users. Such insecurities about the IoT devices and the system are eliminated by using the multiple level user authentication system which is described in the present invention.

The IoT has two connectivity models including Cloud model and Fog model. In the Cloud model, each IoT is directly connected to the server via the internet and in the Fog model, the IoT is not connected directly to the Cloud server but are connected to an intermediate device called router or gateway.

The present invention describes the user authentication system and the protocol which comprises of various levels of authentication of the user. The user authentication system comprises of two levels of authentication. The first level of authentication includes server authentication where the server authenticates the user which is typically done with the help of user name and password. The second level of authentication is done either by the gateway or the device in the Fog model or by the device itself in the Cloud model.

The second Level of authentication is carried out using following steps which are taken at time of each authentication in embedded systems. The authentication process includes provisioning each of the IoT device with a variable formula based on the parameters like stock, system time, high or low temperature of the city and value of a variable from a Cloud; synchronizing time at the two ends; fetching the value on both ends for the same variable such as a stock symbol; system, time, high/low weather temperature of a city, or a variable from a private Cloud; computing a number, as defined by the user (+/−/%* etc) to the variable, based on the provisioning of the URL/device; comparing and confirming the resting code by the IoT device for the end seeking authentication and granting access, if results match and the two ends can commence communication.

Another embodiment of the present invention for multi-level authentication wherein the user ID is any chosen alpha numeric or email which is linked to the mobile phone number or user ID; the user ID here can be the phone number itself. For the second level authentication, when the user logics with user name and password, the user or gateway or IoT asks for the telephone number from the user. If the user number matches the number provisioned either in server or gateway or IoT, the system sends a message to the user to authenticate. The user has an application on its device such as mobile phone or tablet or other PC which authenticates the user based on biometric profile created on such personal device. The user device receives the notification of authentication from the IoT or server or gateway. Once the user is authenticated by the personal device, the device sends a yes or no message if the user is authenticated or not and that message is sent to the IoT or gateway or server. The permission to the IoT is granted once the user is authenticated and the yes is received at the IoT or server or gateway side.

DETAILED DESCRIPTION OF THE INVENTION

The present invention describes the user authentication system and protocol comprising of multiple levels of security which is used to authorize the user to overcome the drawbacks of the prior art. The present invention uses more than one levels of authentication process to authenticate the user and provide them the access to their IoT devices. More particularly, it provides the system, method, computer readable mediums for authentication with a pass code that uses a changing parameter in user-define formula.

The IoT basically is divided into two connectivity models which include Cloud Model and Fog Model. In the cloud model, each IoT devices are directly connected to the server via the internet whereas in the Fog model, the IoT devices are connected to an intermediate device called router or gateway which is further connected to the cloud server.

Figure 1:
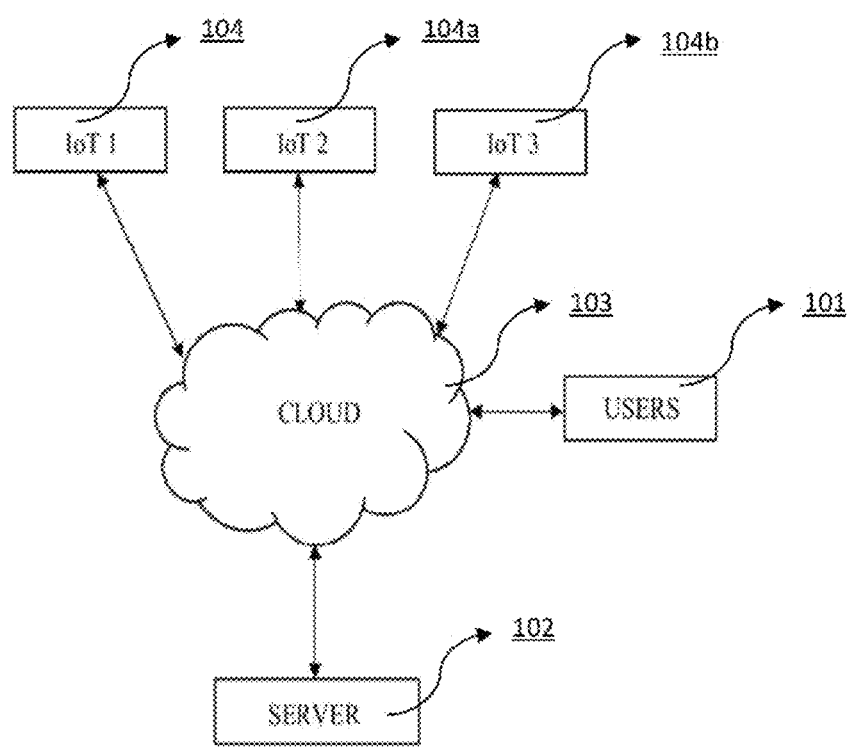
FIG. 1 is a block diagram illustrating the Cloud connectivity model of the Internet of Things (IoT)

FIG. 1, illustrates the block diagram for Cloud model 103 which is one of connectivity models for IoT. The Cloud, model is the connectivity system that enables ubiquitous access to shared pools of configurable system resources that can be provisioned with minimal efforts, over the Internet. In the present invention Cloud model is used as the connectivity means for Internet of Things (IoT).

The model describes that the various IoT devices like IoT1 104, IoT2 104a and Iot3 104b are connected to the Cloud which is connected to the server 102. In this model, the IoT devices are directly connected to the server 102 via interact. The user 101 is connected to the whole cloud model. Another connectivity model which are used by the IoT devices is the Fog model.

Figure 2:
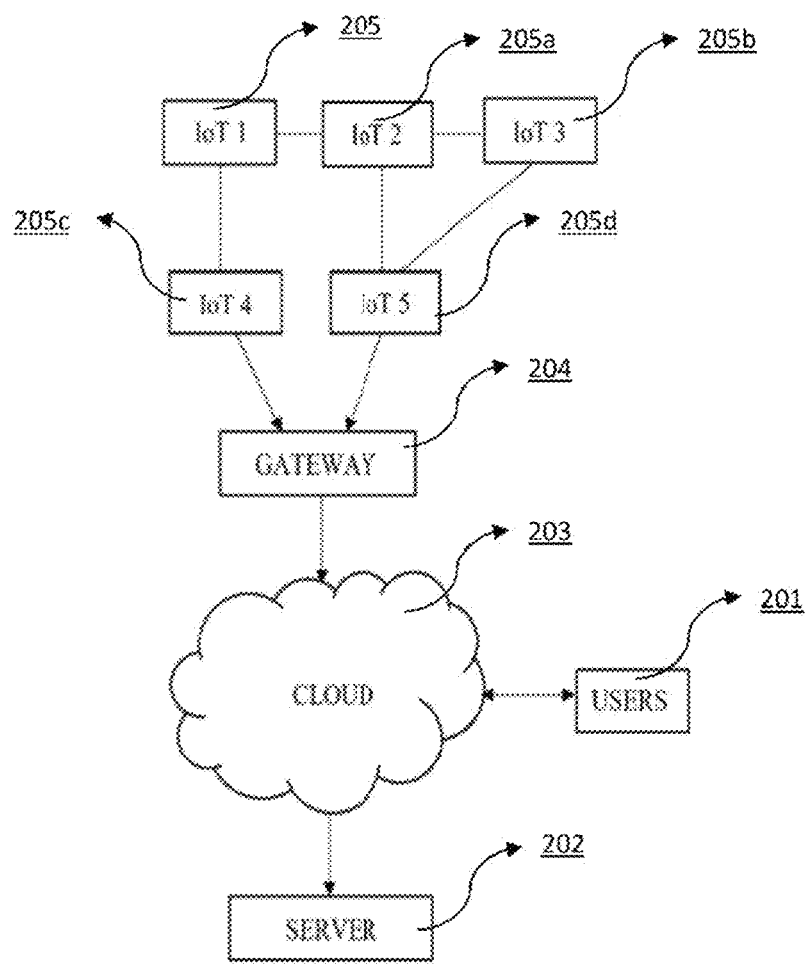
FIG. 2 is a block diagram illustrating the FOG connectivity model of the Internet of Things (IoT)

FIG. 2, illustrates the block diagram for FOG model which is one of connectivity models for IoT. The FOG model is the connectivity system that provides data, compute, storage and application services closer to client or near-user edge devices, such as network routers or gateways. In the present invention FOG model is used as the connectivity means for Internet of Things (IoT). In this FOG model, the IoT, unlike Cloud model, is not directly connected to the server 202 but are connected to an intermediate device called router or gateway 204.

The model describes that the IoT devices like IoT1 205, IoT2 205a, IoT3 205b, IoT4 205c and IoT5 205d are connected to an inter mediate device called router or a gateway 204. The gateway or the router is connected to the cloud 203 which gives connectivity to the users 201. The present invention describes the connectivity models like Cloud model and the Fog model and the user authentication system involved along with the models.

The descriptions of the present invention provides the authentication process to authenticate the user to the IoT devices utilized by the user, such as authentication through ATM machine to a bank account, authentication through a mobile device to an email account and like.

Figure 3:
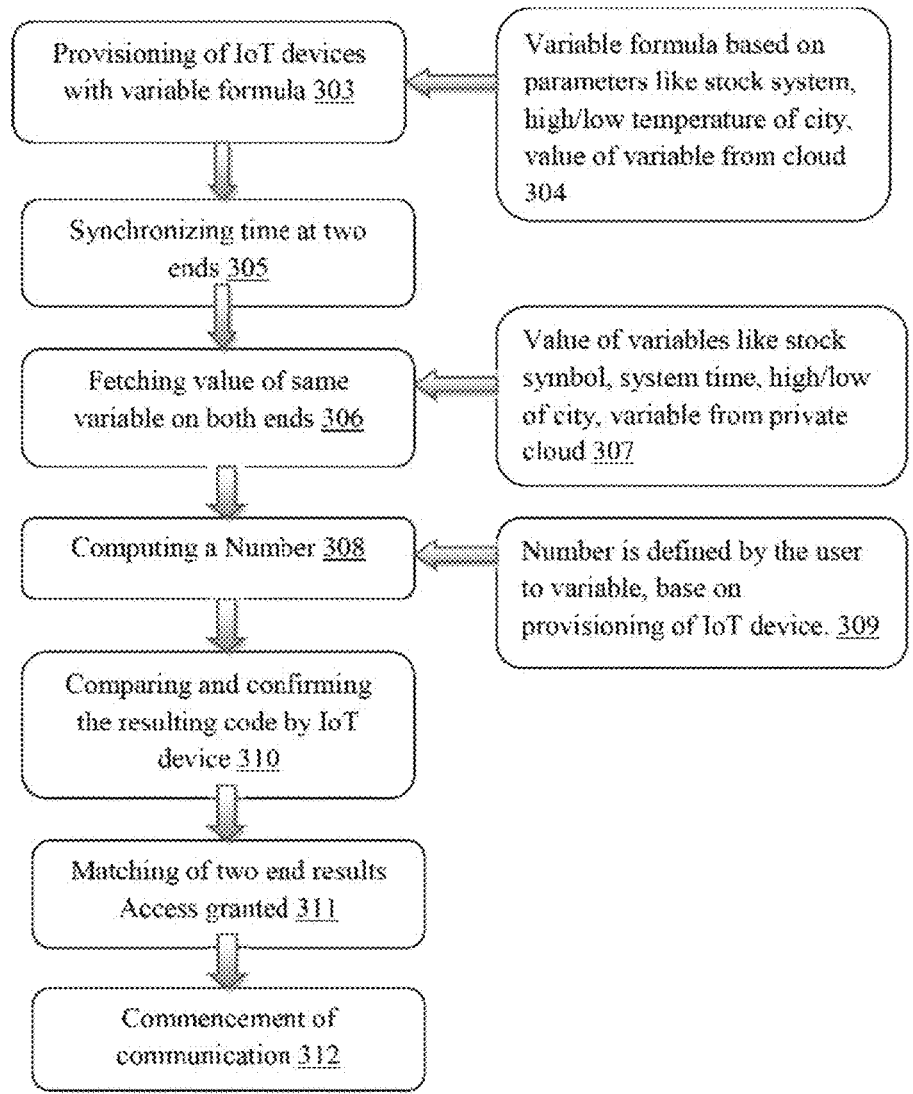
FIG. 3 is a block diagram illustrating the user authentication process for the Internet of Things (IoT) device.

FIG. 3, illustrates the process of user authentication to an IoT device, where it is shown that the authentication system of the present invention comprises two levels of authentication. First level, as seen in FIG. 1, involves server authentication 301 wherein the authentication is done by input of correct and valid username and password 302 credentials by the user. The second level of authentication is done either by the gateway or the device in the Fog model or by the device itself in the Cloud Model. The second level of authentication is carried out in various steps which are taken at time of each authentication in embedded systems. The authentication process includes six steps which authorizes the user by carefully analyzing all the provided data before granting access to the user. The first step of authentication includes provisioning each of the IoT device with a variable formula 303. The variable formula here is based on changing parameters like stock symbol, system time, high/low temperature of a city, variable value from cloud and like 304. The variable formula here is a mathematical formula which is defined by the user which is then provisioned with the IoT device. The mathematical formula includes a changing parameter with the variable (e.g., [changing parameter value]+2) as selected by the user. The second steps involves the synchronizing of the time at two ends 305 i.e. the system time of the user's access device and the IoT device is synchronized. The third step is the fetching of value of the variable on both ends 306 wherein the value can be a stock symbol, system time, high/low temperature of the city, variable value from private cloud and like 307, this value is searched by the user and the IoT device through the internet server in the real time. The fourth step of user authentication involves computing, a number 308 as defined by the user (+/−/%/*) to the variable which is based on the provisioning of the device 309, wherein the real time number or value of the changing parameter fetched in the step three is substituted in the variable formula as defined by the user and the specific value is obtained. The fifth step of the user authentication includes comparing and confirming the resulting code or the value obtained in step four by IoT device 310. This is done for the end seeking authentication. The sixth step includes the matching of the two end results followed by granting access 311 to the user wherein the communication between the user and the IoT device can commence 312.

Figure 4:
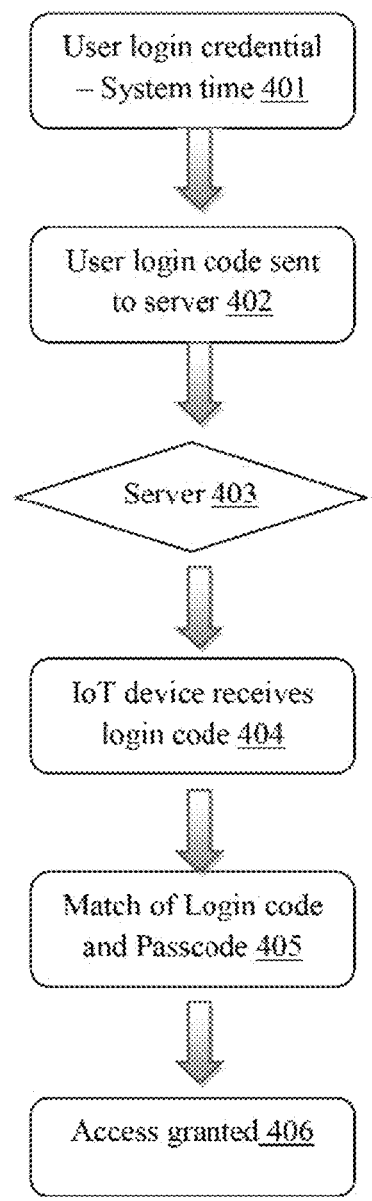
FIG. 4 is a block diagram illustrating the user authentication process based on the user login credentials wherein the user login credential is system time.

FIG. 4 is a block diagram illustrating the user authentication process based on the user login credentials wherein the user login credential is system time. The user login credential are provided during sign-up in the IoT device. As shown in FIG. 4, the user login credential is system time 401, wherein the login code 402 is send to the server 403 since the two ends are time synchronized. The server 403 passes this login code to the IoT embedded device 404 which has its own device passcode provisioned. The matching of login code and device passcode 405, authenticates the user thus granting the access 406 to establish the communication.

Figure 5:
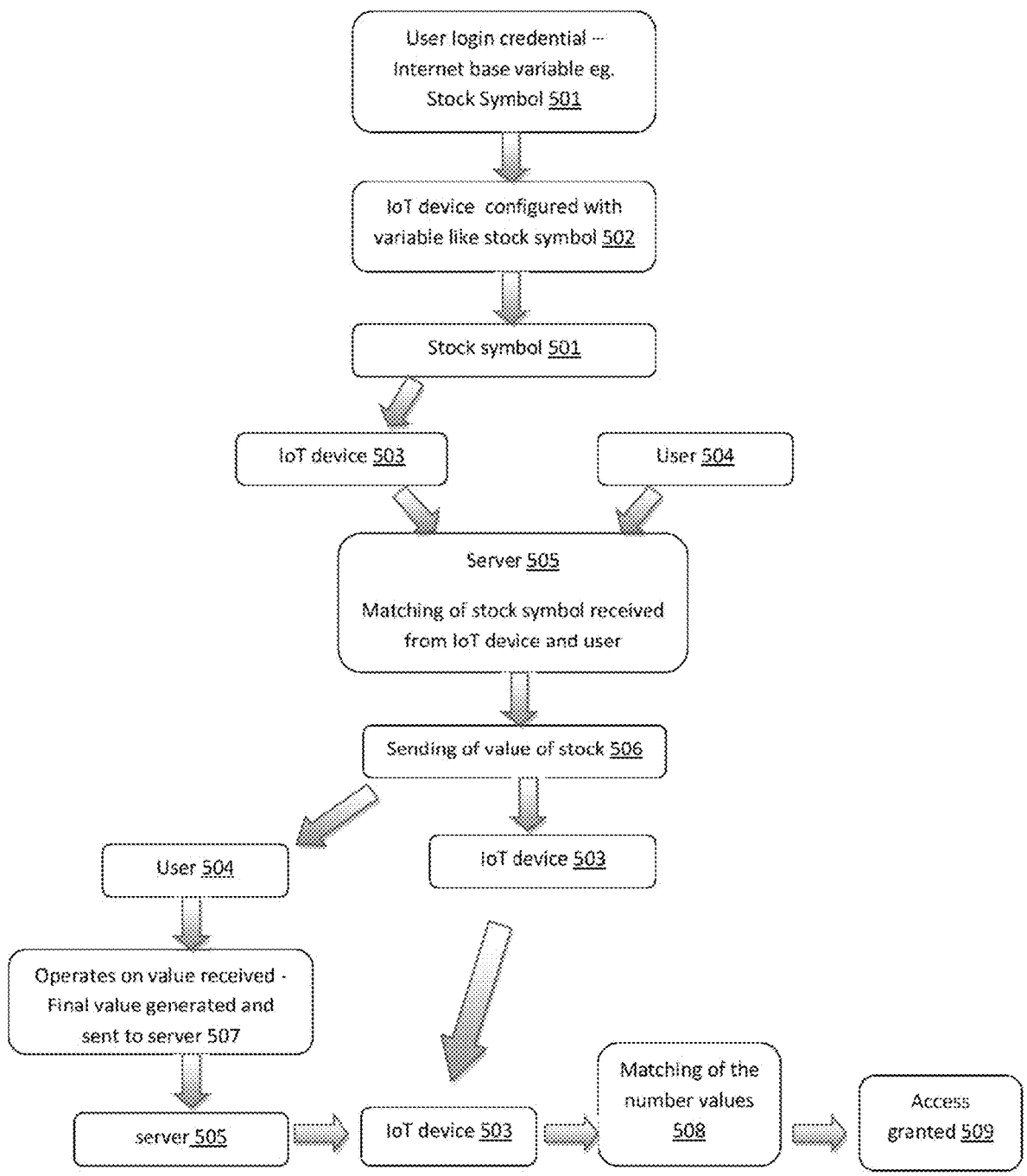
FIG. 5 is a block diagram illustrating the user authentication process based on the user login credentials wherein the user login credential is Internet based variable

FIG. 5 is a block diagram illustrating the user authentication process based on the user login credentials wherein the user login credential is Internet based variable. As shown in the FIG. 5, the Internet based variable is stock symbol 501, the IoT is provisioned with the variable like stock symbol 502. This stock symbol 501 is sent to the server 505 by the IoT device 503 and user 504. The matching of the stock symbol 1 received from IoT des ice 503 and user 504 is carried out at the server 505. If these stock symbols are matched at both ends, the Value of the stock 506 is send by the server 505 to the IoT device 503 and the user 504. The user 504 nosy operates on the received value based on the set up of the login and generates the final value 507 that is then forwarded to the server 505. The server 505 then sends this value to the IoT device 503. The matching of the number values 508 is carried out. The IoT device validates the final value received with the user. If the number value sent to the IoT device matches with value generated by the IoT device itself, the access is granted 509 that establishes the communication.

The internet based variable as described in the FIG. 5 is a changing parameter which can include a stock or index value at given time, number of points scored by the favorite team, a calendar value or a temperature of specified location and like. This changing parameter strengthens the user-defined formula used as the login credential thus increasing the security of the transaction or communication.

Figure 6:
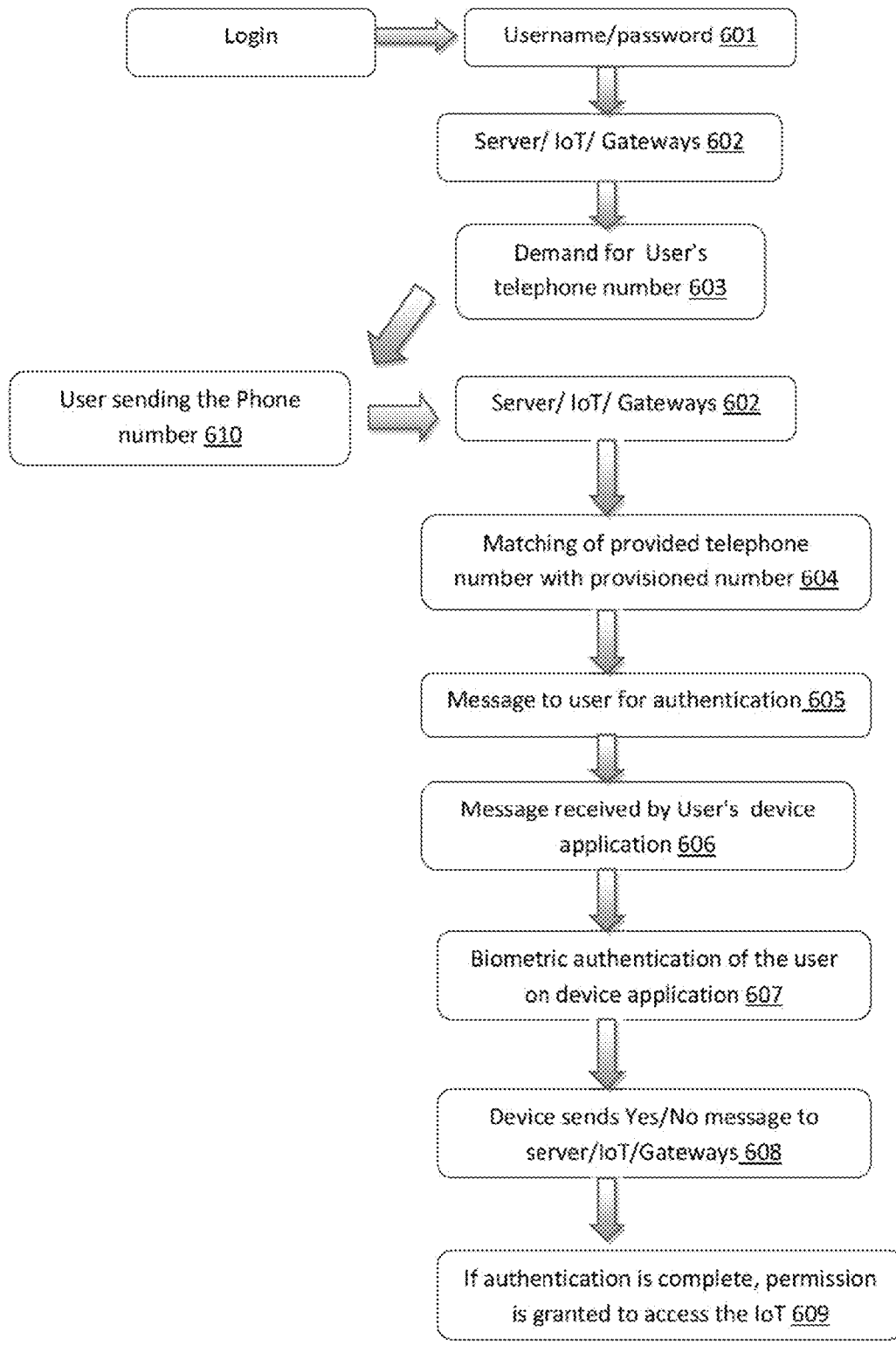
FIG. 6 is a block diagram illustrating the user authentication based on telephone number provisioned to IoT and biometric profile in user's device.

FIG. 6 is a block diagram illustrating the user authentication based on telephone number provisioned to IoT and biometric profile in user's device wherein the user logins through username and password 601. The user ID used here is linked to the telephone number of the user or the user ID is the telephone number of the user itself. In the second level, the username and password is sent to server/IoT/gateway 602. At the server/IoT/gateway the telephone number of the user is asked 603, which is then send by the user 610 to the server/IoT/gateway 602. The received telephone number is matched with the telephone number provisioned with the server/IoT/gateway 604. If the phone number is matched, the message is sent to the user for authentication 605. This message is received by the user's device which has the application for authentication 606. The biometric authentication of the user is done through the biometric profile of the user on the user's device application 607. The device sends the Yes or No message to the server/IoT/gateway about the validation of the authentication 60S. At last, if the validation is complete, the permission is granted to access the IoT 609.

Once the two levels of user authentication is successful, the user is granted access to the IoT device who can retrieve information from the Cloud server. This system of user authentication with high security enables the users to store their sensitive information more safely in the Cloud server and the transactions made by the users also remain secure.

This process of user authentication can be used in various IoT applications like connected wearable with sensors and software which collect data and information about the user that is later pre-processed to extract essential insights about user. The information is mainly pertaining to health, fitness or entertainment. The present invention can be used to store and share this information with IoT in more secured manner.

Another IoT application is the smart homes wherein the user is able to access his air-conditioning, light switches, gadget switches and door locks even when they user is not at home. However this requires the secured authentication and connection with the user which can be provided by the process of user authentication described in the present invention.

Another IoT application which requires the most secure connection, is the connected cars wherein the user is able to control the various operations of the car through connected wearable or mobile phone. This requires the correct user authentication to ensure that the car is controlled by the original owner. The present invention will establish the secure connection between the owner and the car control system.

Example 1

In the given invention the first level of authentication is through username or user ID, and a password as provided by the user. In one embodiment of the present invention, the user ID is linked to the user's phone number. The user ID here can be the user's phone number itself. In the second level of authentication, the IoT device is pre-programmed or provisioned with the variable formula as defined by the user, wherein the variable formula is a mathematical formula. The variable formula includes a changing parameter which can be a stock symbol, a temperature of a particular city, system time etc. During pre-programming of the IoT device, the user is provided with the changing parameter options, from which the user selects the one. In the next step of provisioning, the user selects the operation (+/−/%/*) and the variable of the formula. This, variable formula as defined by the user is then pre-programmed to the IoT device accordingly. For the subsequent authentication of the user, the IoT device asks for the value according to the provisioned variable formula.

Example 2

The multilevel authentication system of the present invention can be explained by taking an example of a specific changing parameter, e.g. Stock symbol. The stock symbol is the changing parameter as selected by the user for provisioning the IoT device. The stock symbol selected here for example is MFST. In addition, the user may configure the IoT to add or subtract, or multiply or divide the value of the stock with some other number to increase the complexity.

E.g., MSFT+5 as the variable used for configuring the IoT. During authentication IoT sends the stock symbol to the server to fetch the stock value at that time (if trading is going on or the last trading value if no active trading) and user does the same by sending to the server the stock symbol. The server ensures the stock symbol received from the IoT and user are the same. If it is same, server fetches the value of the stock and sends that value to the and user. The IoT and user calculates and sends the final value based on the configuration of the IoT. IoT does the same calculations and if the final value sent by the user matches with the final value by the IoT, the IoT gives the access to the user. The matching and calculations can be done in the IoT or server or gateway.

There are other variables instead of stock symbol as shown by the following examples:

IoT is configured with the city such as Boston. IoT sends the name of the city to the server. IoT and user sends the server name of the city. Server gets the temperature of the city such as High and Low for the day which will be 50/30. The IoT and user take that number to be 5030 and performs some additional function based on the configuration and calculates the final number. 5030+5=5035. If IoT receives the final number to be 5035 from the user, the user is granted access to the IoT.

For system time, the user reads its device time such as 11:46 and does additional function if required. Such as 11464+5=1151. User sends tins code to the IoT and IoT also knows the system of the user device as both ends are synchronized. If 1151 is received by the IoT, the access is granted.

The invention claimed is:

1. A user-device authentication system comprising:
    memory configured to store computer-executable instructions, and
    at least one computer processor configured to access the memory and execute the computer-executable instructions to:
        receive, at a third device, a request for access to information from a first device, the first device being a first Internet of Things (IoT) device;
        request a phone number from the first device;
        receive the phone number from the first device;
        determine a user profile associated with the phone number;
        determine a second device associated with the user profile, the second device being a second Internet of Things (IoT) device;
        send a first message to the second device associated with the user profile, the first message requesting user authentication on the second device using biometric information configured to be obtained on the second device;
        receive a second message from the second device, the second message validating authentication based on the biometric information obtained on the second device;
        send a third message to the first device granting access to information to the first device based on the second message validating authentication; and
        share, by the third device, the information with the first device.
2. The user-device authentication system of claim 1, wherein a user identification is associated with the user profile and corresponds to the first device and the second device.
3. The user-device authentication system of claim 1, wherein the biometric information obtained on the second device is a fingerprint or an iris scan.
4. The user-device authentication system of claim 1, wherein receiving a request for access from a first device comprises receiving a user identification and password from the first device, and further comprising determining that the user identification and password match a known user identification and known password corresponding to the known user identification.
5. The user-device authentication system of claim 1, wherein the second device maintains, on the second device, second biometric information for validating the biometric information obtained on the second device.
6. The user-device authentication system of claim 1, wherein the request for access to information from the first device comprises one or more of a request for access to health information, fitness information, or entertainment information.
7. The method of claim 1, wherein the phone number corresponds to the second device.
8. A method for granting access to information by a first device, the method comprising:
    receiving, by the first device, a request for access to information from a second device, the second device being a first Internet of Things (IoT) device;
    sending, by the first device, a request for a phone number to the second device;
    receiving, by the first device, the phone number;
    determining, by the first device, a user profile associated with the phone number;
    determining, by the first device, a third device corresponding to the user profile, the third device being a second Internet of Things (IoT) device;
    sending, by the first device, a request for biometric authentication using biometric information obtained on the third device to the third device;
    receiving, by the third device, the request for biometric authentication;
    obtaining, by the third device, first biometric information;
    determining, by the third device, that first biometric information obtained on the third device matches second biometric information saved on the third device;
    receiving, by the first device, a message indicating that the biometric information has been authenticated by the third device;
    sending, by the first device, instructions granting the request for access to information to the second device; and
    sharing, by the first device, the information with the second device.
9. The method of claim 8, wherein the biometric information comprises at least one of a fingerprint or an iris scan.
10. The method of claim 8, wherein the phone number and user profile are associated with the second device.
11. The method of claim 8, wherein the request for access from the second device comprises one or more of a request for access to health information, fitness information, or entertainment information.
12. A method for granting a first device access to information, the method comprising:
    receiving, by a third device, a request for access to information from the first device, the first device being a first Internet of Things (IoT) device;
    requesting, by the third device, phone number from the first device;

receiving, by the third device, the phone number from the first device;

determining, by the third device, a user profile associated with the phone number;

determining, by the third device, a second device associated with the user profile, the second device being a second Internet of Things (IoT) device;

sending, by the third device, a first message to the second device associated with the user profile, the first message requesting user authentication on the second device using biometric information obtained on the second device;

receiving, by the second device, the first message requesting user authentication on the second device using biometric information;

obtaining, by the second device, first biometric information;

determining, by the second device, that first biometric information obtained on the second device matches second biometric information saved on the second device;

receiving, by the third device, a second message from the second device, the second message validating authentication based on the biometric information obtained on the second device; and sending, by the third device, a third message to the first device granting access to information to the first device based on the second message validating authentication.

13. The method of claim 12, wherein the biometric information obtained on the second device is a fingerprint or an iris scan.

14. The method of claim 12, wherein the request for access to information from the first device comprises one or more of a request for access to health information, fitness information, or entertainment information.

* * * * *